Nov. 3, 1970     C. R. WALKER     3,537,711
PRESSURE DIFFERENTIAL SEAL
Filed May 22, 1969
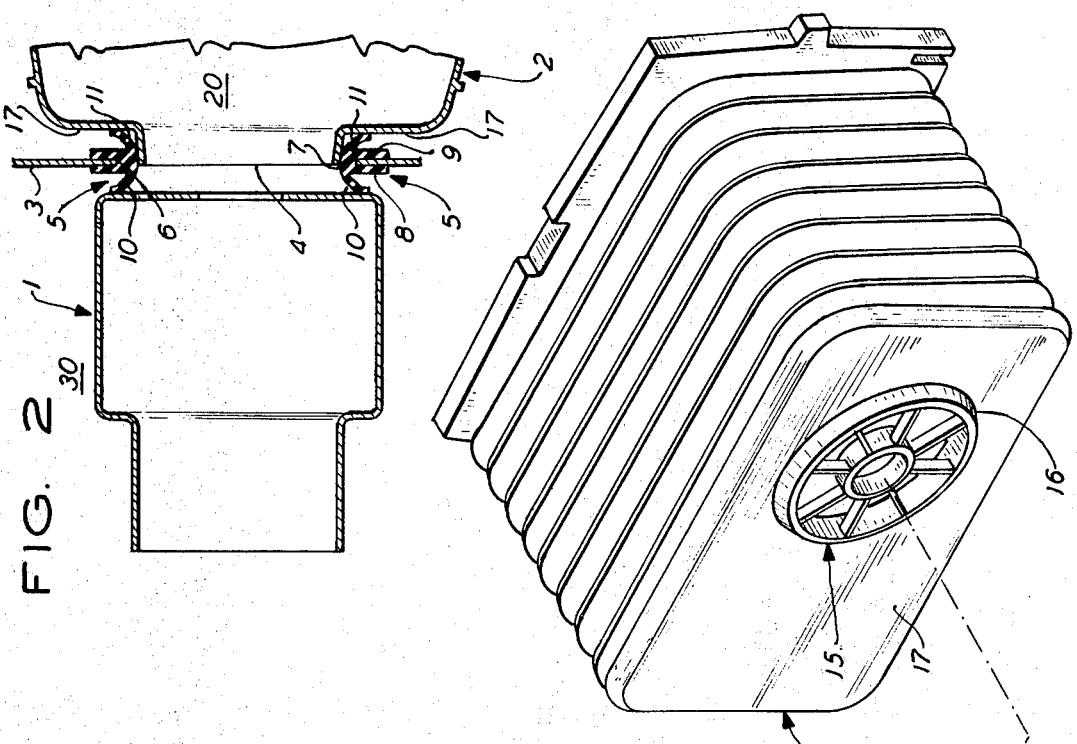
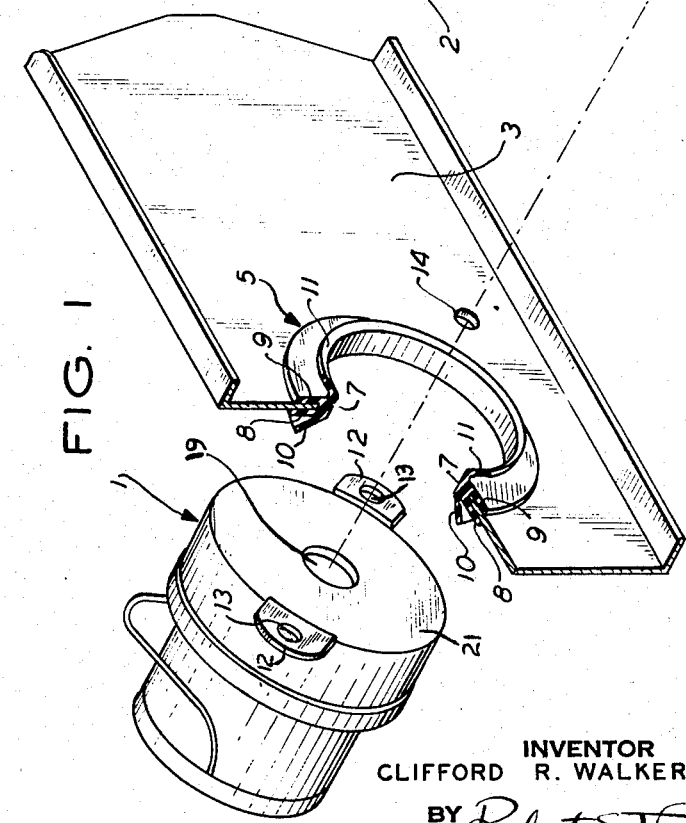
INVENTOR
CLIFFORD R. WALKER
BY *Robert S. Vermut*
ATTORNEY United States Patent Office 3,537,711
Patented Nov. 3, 1970

3,537,711
PRESSURE DIFFERENTIAL SEAL
Clifford R. Walker, Peabody, Mass., assignor to Proctor-Silex Incorporated, Philadelphia, Pa., a corporation of New York
Filed May 22, 1969, Ser. No. 827,004
Int. Cl. F16j *15/16;* B61f *15/22*
U.S. Cl. 277—12         5 Claims

ABSTRACT OF THE DISCLOSURE

A thin-walled, soft rubber, annular gasket has a base portion with four circumferentially continuous flanges extending outwardly therefrom, the two intermediate flanges being substantially parallel and forming a channel adapted to securely receive the structural perimeter of an opening in a vacuum cleaner support plate and the other two flanges diverging from each other. The two other flanges, located on opposite sides of the support plate, are adapted to abut against a motor housing on one side and a vacuum chamber housing on the other side of the plate with the flanges remaining substantially outwardly divergent, thus increasing the effective sealing relationship between the gasket and housings as the pressure external to the housings exceeds the substantially common internal pressure thereof.

CROSS REFERENCES TO RELATED APPLICATIONS

This application discloses subject matter related to subject matter disclosed in application Ser. Nos. 827,003 and 827,010, filed on May 22, 1969 and on May 22, 1969, respectively, the former application and the instant application being component disclosures of the latter application. Each of the related applications is assigned to the same assignee as the instant application.

BACKGROUND OF THE INVENTION

Field of the invention

This invention relates to the field of gaskets for sealing surfaces exposed to a desirable pressure differential. More particularly, this invention relates to the field of vacuum cleaners and the sealing relationship between the structure defining the internal low pressure area and the external atmospheric or high pressure area. The structure defining the pressure areas comprises a plurality of components which are readily capable of being assembled and dissassembled.

Description of the prior art

The prior art in the field of vacuum cleaners has been directed toward a fixed relationship of internal components, especially motor and vacuum chamber housings, and has not shown a gasket wherein the sealing effectiveness increases with increased pressure differential.

Also, the concept of a plurality of components which are releasably interconnected so that the user may readily assemble and disassemble the vacuum cleaner for self-servicing, repair, and/or replacement of parts manually without the use of tools has not been shown. This concept is fully disclosed in application Ser. No. 827,010, mentioned above.

It should be recognized that the need for a new gasket in sealing the internal low pressure area of a vacuum cleaner from the external atmospheric high pressure area arose in order to effectively accomplish the latter mentioned concept in vacuum cleaner construction, and fulfillment of the need has resulted in the accomplishment of this concept. Also, fulfillment of the need has resulted in a gasket with increasing sealing effectiveness as the desired pressure differential increases.

SUMMARY OF THE INVENTION

The present invention is based in principle on the extension of a flexible portion of sealing means toward the high pressure area and into contact with a surface exposed to a pressure differential. Thus, the net force on the portion urges the portion into greater sealing contact with the surface.

The sealing relationship of the preferred embodiment is employed in a vacuum cleaner and is accomplished by a flexible, annular gasket having a base portion and four circumferentially continuous flanges outwardly extending therefrom with the two intermediate flanges being substantially parallel and spaced apart a sufficient distance to tightly receive the structural perimeter of a hole in a support plate, with the other two flanges diverging from each other and abutting the motor and vacuum chamber housings on respective sides of the plate.

It is therefore an object of the present invention to provide a sealing relation for surfaces exposed to a desired pressure differential with increased sealing effectiveness as the pressure differential increases.

It is also an object of the present invention to provide an efficient sealing means in combination with the structural means defining the vacuum cleaner low pressure area and the vacuum cleaner high pressure area.

It is also an object of the present invention to provide a sealing relationship between motor and vacuum chamber housings which facilitates assembly and disassembly of the housings as components of a vacuum cleaner construction manually and without the use of tools.

These and other objects, features, and advantages of the present invention will become more apparent when viewing the following description and claims in the light of the accompanying drawing.

BRIEF DESCRIPTION OF THE DRAWING

FIG. 1 is an exploded view of the motor housing, the support plate (bulkhead) and gasket cut away in part, and the vacuum chamber housing; and FIG. 2 is a cross-sectional view of the motor and vacuum chamber housings, the support plate and the gasket in interrelationship.

DESCRIPTION OF THE PREFERRED EMBODIMENTS

Referring now more particularly to the drawing with reference numerals, in FIGS. 1 and 2 structural means such as motor and vacuum chamber housings of a vacuum cleaner are shown, the motor housing being generally designated at 1 and the vacuum chamber housing being generally designated at 2. Interposed between the two housings is further structural means, i.e., a vacuum cleaner support plate or bulkhead 3, preferably made of steel, which has an opening 4 therethrough and sealing means such as an annular flexible gasket, generally designated at 5, securely positioned on the structural perimeter 6 of the bulkhead which perimeter defines the opening 4.

The gasket 5 is preferably thin-walled and made of soft rubber and comprises a base or support portion 7 with four circumferentially continuous flanges extending outwardly therefrom. The intermediate flanges 8 and 9 extend substantially parallel and are spaced apart a distance sufficient to securely receive the perimeter 6 of the plate 3. The other two flanges or flexible means 10 and 11 diverge from each other as they extend outwardly from the base portion 7 into contact, respectively, with the motor and vacuum chamber housings.

The motor housing as can be noted from FIG. 1 is of conventional type for a convention motor blower and has a suction opening 19 in end surface 21 and a pair of diametrically opposed connector flanges 12 which extend parallel to the support plate 3 when the motor housing is in operative position. The support plate has a pair of diametrically opposed openings 14 each of which is in alignment with an opening 13 on each flange 12, each pair of aligned openings being adapted to receive a conventional quarter-turn fastener to securely position the motor housing with respect to the support plate with gasket flange 10 therebetween. The conventional quarter-turn fastener is utilized as one way of accomplishing the vacuum cleaner concept mentioned hereinabove.

The vacuum chamber housing, as seen in FIG. 1, is preferably made of molded plastic and has a filter standoff for fluid flow through end surface 17 and generally designated at 15 the standoff 15 includes an annular flange 16 tapering uniformly inwardly at an angle of approximately 10 degrees. As seen in FIG. 2, the outwardly extending gasket flange 11 abuts against the vacuum chamber end surface 17 while the flange 16 is dimensioned to be easily but snuggly received within the base portion 7 of the annular gasket 5. Mechanical means may be utilized to position the housing 2 with respect to the plate 3, but this concerns the aforementioned vacuum cleaner concept and not the present invention.

In operation, as the motor blower draws air out of the vacuum chamber housing through standoff 15 and opening 19, creating a negative or low pressure internal area therein generally designated at 20, the pressure of the external area generally designated at 30 and exposed to atmospheric pressure becomes high relative thereto, the internal pressure of the motor and vacuum chamber housings being at a substantially common, negative pressure because of the flow communication between the housings.

The sealing means 5 further defines and separates areas 20 and 30 and, as a consequence of the increasing pressure differential, each of the flanges 10 and 11 are acted on by forces over their external sides exposed to area 30 greater than the forces acting on their internal sides exposed to area 20. The net force, as a result of the pressure differential, urges each of the flanges 10 and 11 inwardly into a greater sealing relationship with its respective contacted housing.

It should be noted that the preferred embodiment may be modified within the scope of the present invention to accommodate a vacuum cleaner which does not utilize a support plate or bulkhead 3. The gasket 5 may, therefore, be modified to define in cross-section, e.g., a substantially cup-shaped member with no intermediate flanges. In this regard the gasket base portion may be securely supported by the filter standoff flange 16 and/or the flange 11 of the gasket may be adhesively secured to the filter standoff flange and/or the portion 17 to provide a secure support relationship therewith. In any embodiment, the gasket flexible means will be forcibly moved into greater sealing relationship with the contacted surfaces as the pressure differential between high and low pressure areas increases.

Since the preferred embodiment may be modified in numerous ways within the scope of the present invention, as, e.g., by changing materials employed, by non-use of a support plate and/or intermediate gasket flanges et cetera, the preferred embodiment should be viewed as illustrative and not in a limiting sense.

What I claim is:

1. The combination of structural means defining at least two areas at a pressure differential and sealing means further defining and separating said areas, said sealing means being secured to said structural means, said structural means presenting a pair of opposed surfaces with each surface having an opening therein permitting fluid communication between said structural means, said sealing means having flexible means in contact with said structural means, and said flexible means extending into contact with said structural means in a direction toward the area at a higher pressure and being exposed on one side to the higher pressure area and on the other side to the lower pressure area so that the net force on said flexible means will flex and urge said flexible means into greater sealing contact with said structural means, said sealing means comprising a gasket and said flexible means comprising at least one outwardly divergent portion in continuous contact with at least one of said surfaces about its opening.

2. The combination set forth in claim 1 wherein said structural means comprises a plurality of components interrelated to define an external high pressure area and an internal low pressure area.

3. The combination set forth in claim 2 wherein said plurality of components include a housing containing a motor blower and a vacuum chamber housing, said housings being in spaced relation to one another.

4. The combination set forth in claim 3 wherein said plurality of components further includes a support plate interposed between said opposed surfaces and having an opening therethrough aligned with said openings in said surfaces, and said plate supporting said sealing means.

5. The combination set forth in claim 4 wherein said sealing means comprises an annular gasket having a base portion and a pair of substantially parallel flanges projecting outwardly thereon and forming a channel which receives the structural perimeter of the support plate opening, and said flexible means comprises a pair of circumferentially continuous flanges extending divergently from said base portion on opposite sides of said support plate toward respective surfaces.

References Cited
UNITED STATES PATENTS

| | | | |
|---|---|---|---|
| 2,309,446 | 1/1943 | Ekkebus | 277—178 X |
| 2,518,851 | 8/1950 | Anderson | 16—2 |
| 2,779,432 | 1/1957 | Meyerhoefer | 55—312 |
| 3,151,674 | 10/1964 | Heller et al. | 277—178 X |
| 3,257,784 | 6/1966 | Grellsson | 15—327 X |

SAMUEL ROTHBERG, Primary Examiner

U.S. Cl. X.R.

277—178, 206; 15—327; 55—472